(12) United States Patent  (10) Patent No.: US 8,085,310 B2
Matsumoto  (45) Date of Patent: Dec. 27, 2011

(54) IMAGE CAPTURING APPARATUS AND POWER SUPPLY CONTROL METHOD THEREFOR

(75) Inventor: Shinichi Matsumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1122 days.

(21) Appl. No.: 11/435,898

(22) Filed: May 18, 2006

(65) Prior Publication Data

US 2006/0263066 A1    Nov. 23, 2006

(30) Foreign Application Priority Data

May 20, 2005    (JP) .................................. 2005-148540

(51) Int. Cl.
*H04N 5/232* (2006.01)
*H04N 5/225* (2006.01)

(52) U.S. Cl. ........... 348/211.3; 348/207.11; 348/211.99; 348/372

(58) Field of Classification Search .... 348/211.1–211.3, 348/211.8, 211.14, 333.07, 333.13, 372
See application file for complete search history.

(56) References Cited

U.S. PATENT DOCUMENTS

| | | | | |
|---|---|---|---|---|
| 5,969,555 A | * | 10/1999 | Suda | 327/172 |
| 6,559,885 B2 | * | 5/2003 | Wakui | 348/211.4 |
| 6,597,389 B2 | * | 7/2003 | Tanaka et al. | 348/14.08 |
| 6,809,759 B1 | * | 10/2004 | Chiang | 348/211.2 |
| 2003/0179306 A1 | * | 9/2003 | Lee | 348/333.07 |
| 2003/0218690 A1 | * | 11/2003 | Sakaegi | 348/372 |
| 2006/0017811 A1 | * | 1/2006 | Mizutani | 348/207.1 |
| 2006/0139459 A1 | * | 6/2006 | Zhong | 348/211.2 |

FOREIGN PATENT DOCUMENTS

| | | | |
|---|---|---|---|
| JP | 8-205016 | | 8/1996 |
| JP | 9-238296 | | 9/1997 |
| JP | 9-271019 | | 10/1997 |
| JP | 2000163165 A | * | 6/2000 |

* cited by examiner

*Primary Examiner* — David Ometz
*Assistant Examiner* — Carramah J Quiett
(74) *Attorney, Agent, or Firm* — Fitzpatrick, Cella, Harper & Scinto

(57) ABSTRACT

An image capturing apparatus is separably connected to a display device. The display device has a remote power supply control function of activating or deactivating the image capturing apparatus via a circuit. The image capturing apparatus activates the image capturing apparatus when a power supply button arranged on the image capturing apparatus is operated by the user, causes the display device to activate the power supply by remote control, causes the display device to deactivate the image capturing apparatus by remote control, and switches between inhibiting power supply deactivation and permitting power supply deactivation depending on whether the power supply is activated by a direct power supply activation unit or by a remote power supply activation unit.

8 Claims, 12 Drawing Sheets

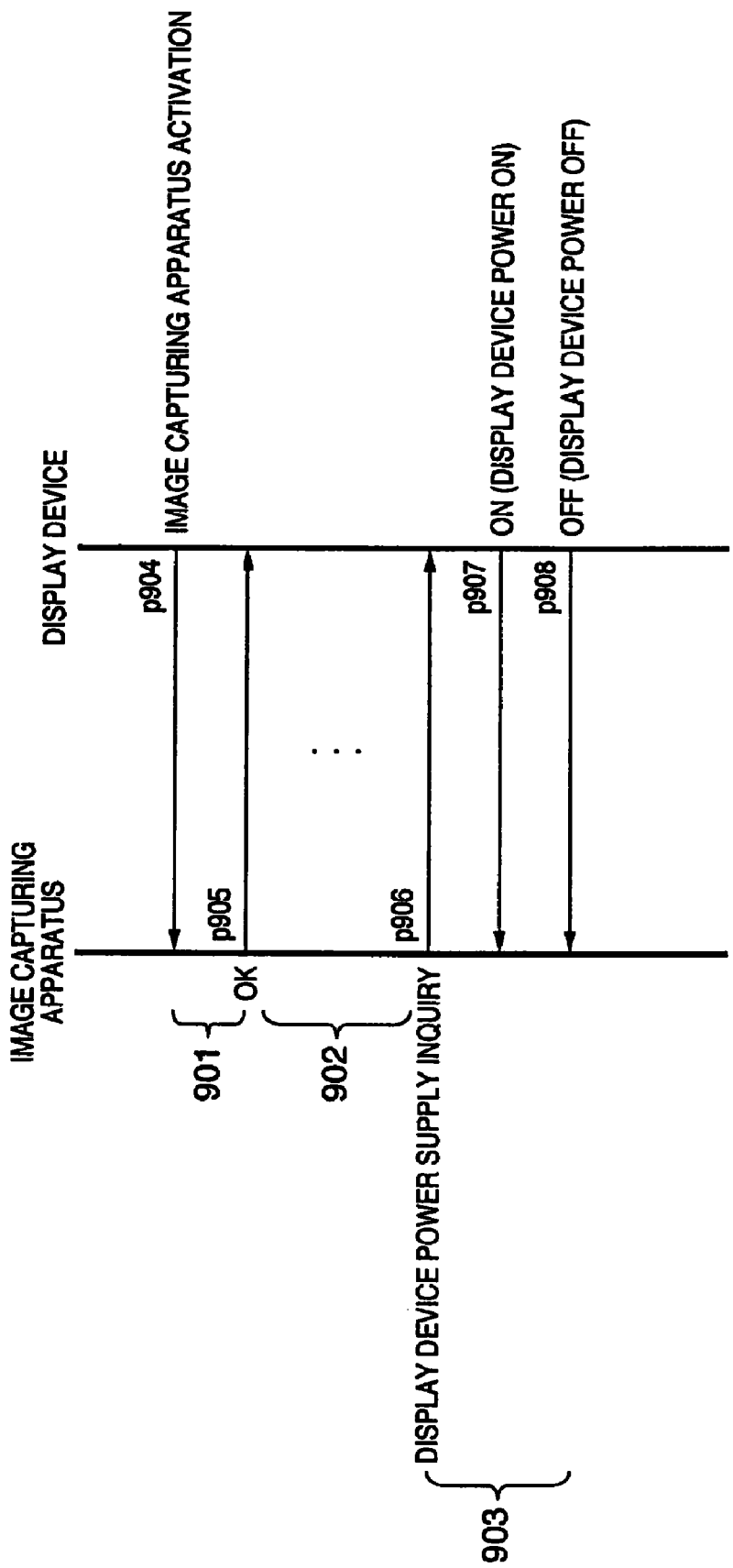

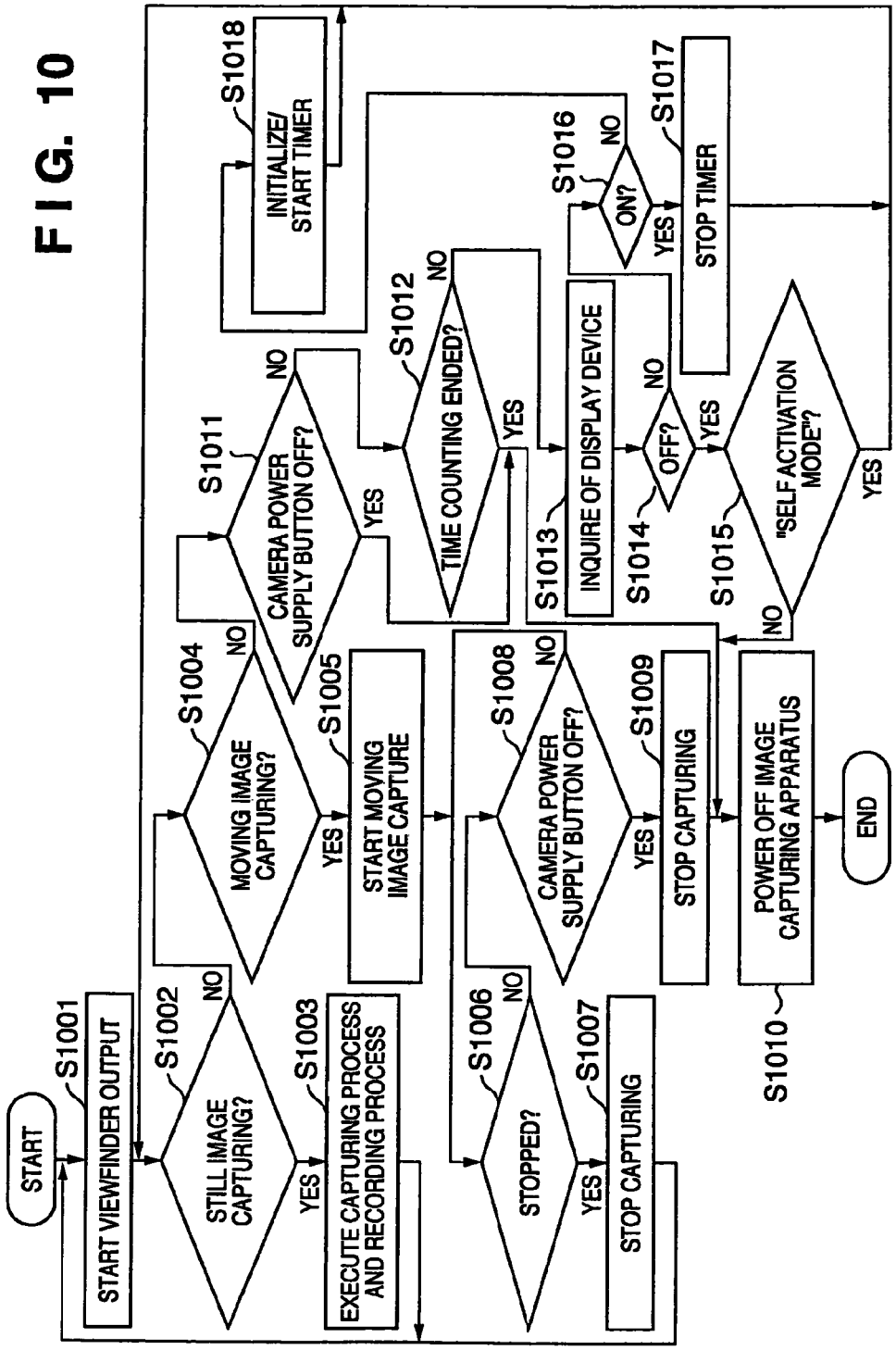

IMAGE CAPTURING APPARATUS AND POWER SUPPLY CONTROL METHOD THEREFOR

FIELD OF THE INVENTION

The present invention relates to an image capturing apparatus and a power supply control method therefor, e.g., a technique preferably used to control the power supply of a communication camera which can exchange data between a separate image capturing apparatus and display device.

BACKGROUND OF THE INVENTION

In general, a digital camera and video camera have a structure that integrates an image capturing apparatus including a CCD, a signal processing circuit, and a lens to capture an image, a display device to display a moving image in a viewfinder, and a recording unit to record sensed image data. Alternatively, in some cases, an image capturing apparatus can be separated from a display device and a recording unit. The image capturing apparatus and the display device and recording unit are connected by a dedicated cable to transmit a video signal.

Moreover, there is proposed a method of separating only a recording unit, causing an image capturing apparatus (or image capturing apparatus and display device) to transmit sensed image data to the recording unit by radio communication, and recording this data therein (e.g., Japanese Patent Laid-Open No. 9-238296). Furthermore, there is also proposed a method of separating only a display device, causing an image capturing apparatus to transmit a viewfinder display image by radio communication such as infrared rays, and displaying this image on the separated display device (e.g., Japanese Patent Laid-Open No. 08-205016).

In a system using an image capturing apparatus and display device in a separated state, the display device and image capturing apparatus respectively have power supply switches for activating them. When they are to be used as a set, both the switches must be operated to activate the power supply. Alternatively, a method of causing a terminal on a network to remotely control the power supply of a camera is also proposed (e.g., U.S. Pat. No. 6,597,389 (Japanese Patent Laid-Open No. 09-271019)).

Consider a case wherein when an image capturing apparatus and a display device are used in a separated state, the display device remotely ON/OFF-controls the image capturing apparatus. For example, to control a fixed radio communication camera in a remote place, the display device activates the image capturing apparatus by remote control. After that, even when the use of the display device is interrupted (power OFF), the image capturing apparatus is kept ON. This wastes power consumption in the image capturing apparatus. Moreover, for example, when the user is performing the image capturing operation by directly operating the image capturing apparatus, allowing the display device to execute the remote power supply control operation causes a failure in normal image capturing operation.

SUMMARY OF THE INVENTION

The present invention has been made in consideration of the above problems, and has as its object to prevent wasteful power consumption when an image capturing apparatus and display device are separate.

It is another object of the present invention to achieve a normal image capturing operation by remote power supply control by a display device.

According to the present invention, there is provided an image capturing apparatus which includes an image sensing unit and can execute data transfer and remote control with a display device which displays an image captured by the image capturing apparatus. The apparatus comprises a direct power supply activation unit which activates the image capturing apparatus by supplying power thereto when a power supply button of the image capturing apparatus is operated by a user, a remote power supply activation unit which activates the image capturing apparatus by supplying power thereto by remote control from the display device, a power supply deactivation unit which deactivates the image capturing apparatus by deactivating power thereto by remote control from the display device, and a power supply deactivation control unit which switches between inhibiting power supply deactivation by the power supply deactivation unit and permitting power supply deactivation by the power supply deactivation unit depending on whether the power supply is activated by the direct power supply activation unit or by the remote power supply activation unit.

According to the present invention, there is provided a power supply control method for an image capturing apparatus which includes an image sensing unit and can execute data transfer and remote control with a display device which displays an image captured by the image sensing unit. The method comprises a direct power supply activation step of activating the image capturing apparatus by supplying power thereto when a power supply button of the image capturing apparatus is operated by a user, a remote power supply activation step of activating the image capturing apparatus by supplying power thereto by remote control from the display device, a power supply deactivation step of deactivating the image capturing apparatus by deactivating power thereto by remote control from the display device, and a power supply deactivation control step of switching between inhibiting power supply deactivation in the power supply deactivation step and permitting power supply deactivation at the power supply deactivation step depending on whether the power supply is activated at the direct power supply activation step or at the remote power supply activation step.

According to the present invention, there is provided a computer program for making a computer execute a power supply control method for an image capturing apparatus which includes an image sensing unit and can execute data transfer and remote control with a display device which displays an image captured by the image sensing unit. The method comprises a direct power supply activation step of activating the image capturing apparatus by supplying power thereto when a power supply button of the image capturing apparatus is operated by a user, a remote power supply activation step of activating the image capturing apparatus by supplying power thereto by remote control from the display device, a power supply deactivation step of deactivating the image capturing apparatus by deactivating power thereto by remote control from the display device, and a power supply deactivation control step of switching between inhibiting power supply deactivation in the power supply deactivation step and permitting power supply deactivation at the power supply deactivation step depending on whether the power supply is activated at the direct power supply activation step or at the remote power supply activation step.

According to the present invention, there is provided a recording medium recording the above-described computer program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a diagram showing the radio communication processing sequence according to the preferred second embodiment of the present invention;

FIG. 10 is a flowchart showing a camera process according to the preferred second embodiment of the present invention;

DETAILED DESCRIPTION OF THE PREFERRED EMBODIMENTS

First Embodiment

A preferred embodiment of the present invention will be described below with reference to the accompanying drawings.

Figure 1:
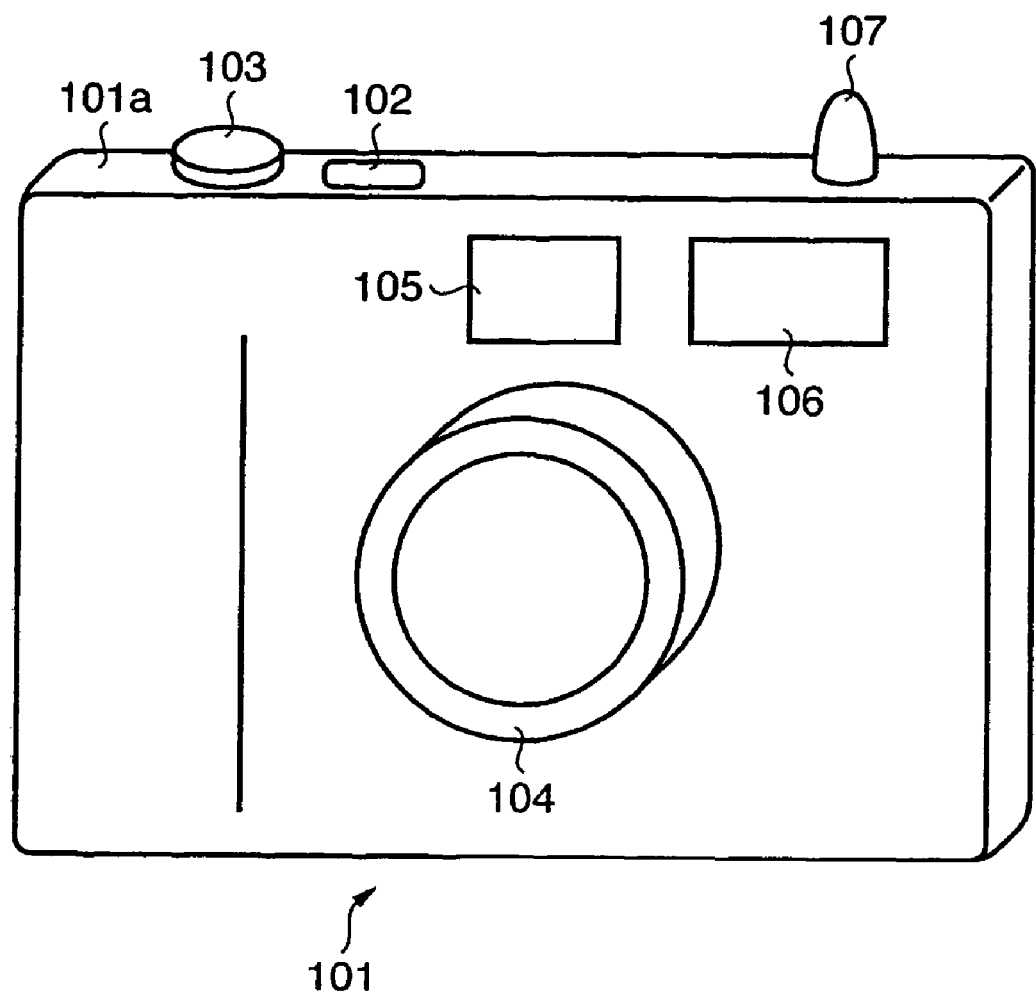
FIG. 1 is a front view showing the outer appearance of an image capturing apparatus according to the preferred first embodiment of the present invention.
Figure 2:
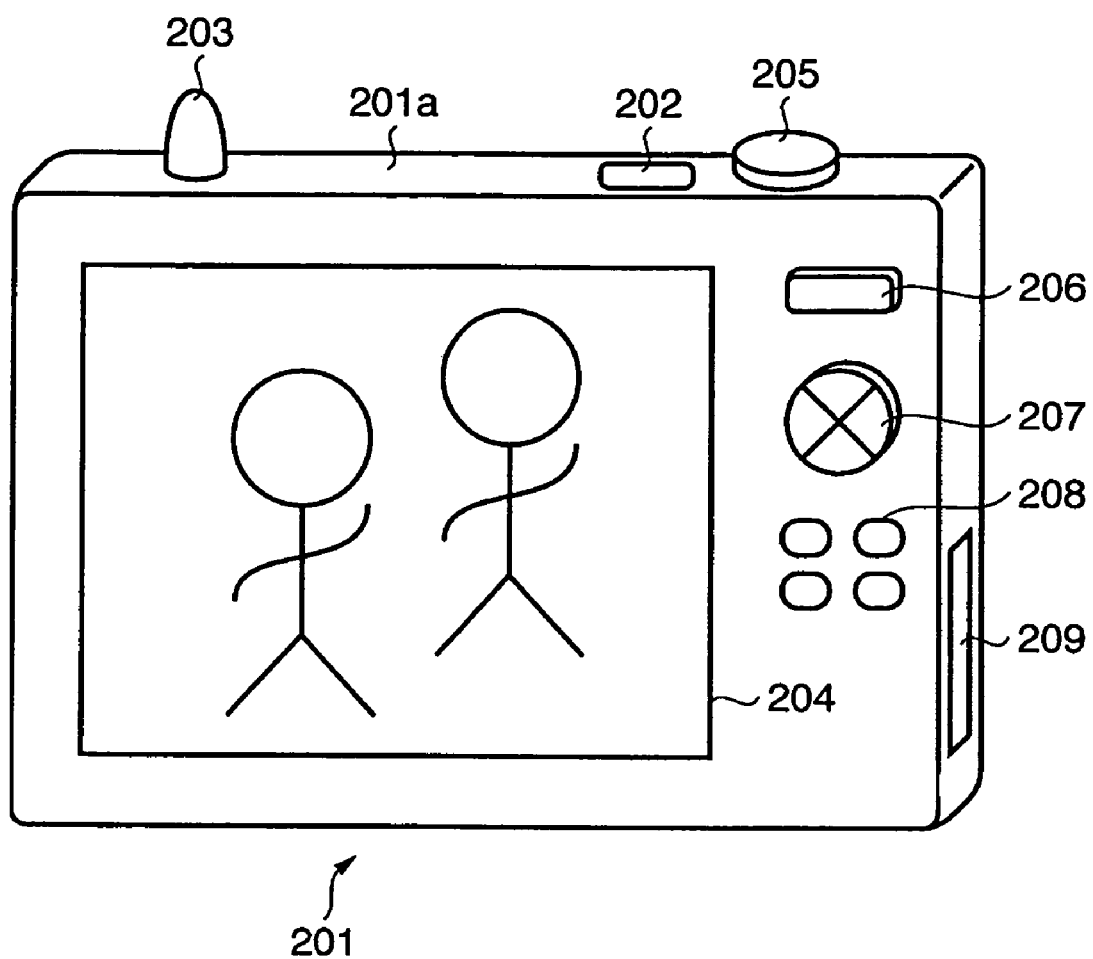
FIG. 2 is a front view showing the outer appearance of a display device according to the preferred first embodiment of the present invention.

A radio communication camera according to this embodiment comprises an image capturing apparatus having the outer appearance shown in FIG. 1 and a display device having the outer appearance shown in FIG. 2.

FIG. 1 is a front view showing an image capturing apparatus 101. The image capturing apparatus 101 shown in FIG. 1 comprises a housing 101a, power supply button 102, shutter button 103, lens 104, optical viewfinder 105, an electronic flash 106, and radio communication antenna 107. If the power supply is OFF, the lens 104 is accommodated in the housing 101a of the image capturing apparatus 101. The power supply button 102 has an ON/OFF function capable of alternately activating/deactivating the power supply every time it is pressed. As the power supply is activated, the lens is pushed forward so as to enable image capturing.

A display device 201 shown in FIG. 2 comprises a housing 201a, power supply button 202, a radio communication antenna 203, a liquid crystal display device 204, a shutter button 205, a zoom button 206, operation buttons 207 and 208, and external memory slot 209.

During the image capturing operation, viewfinder data transmitted from the image capturing apparatus by radio communication is displayed on the liquid crystal display device 204. Operating the operation buttons 207 and 208 makes it possible to remote-control the image capturing apparatus by radio communication. As the shutter button 205 is pressed, a capture instruction is issued to the image capturing apparatus by radio communication. A still image is captured by the image capturing apparatus.

Figure 3A:
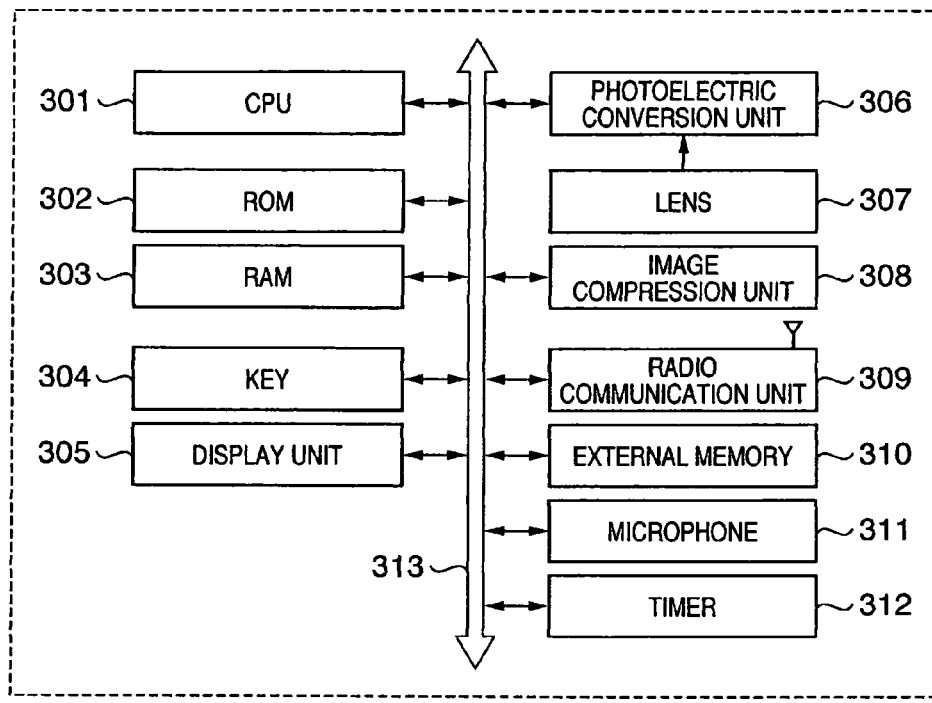
FIGS. 3A and 3B are block diagrams showing the internal arrangements of the image capturing apparatus and display device according to the preferred first embodiment of the present invention.
Figure 3B:
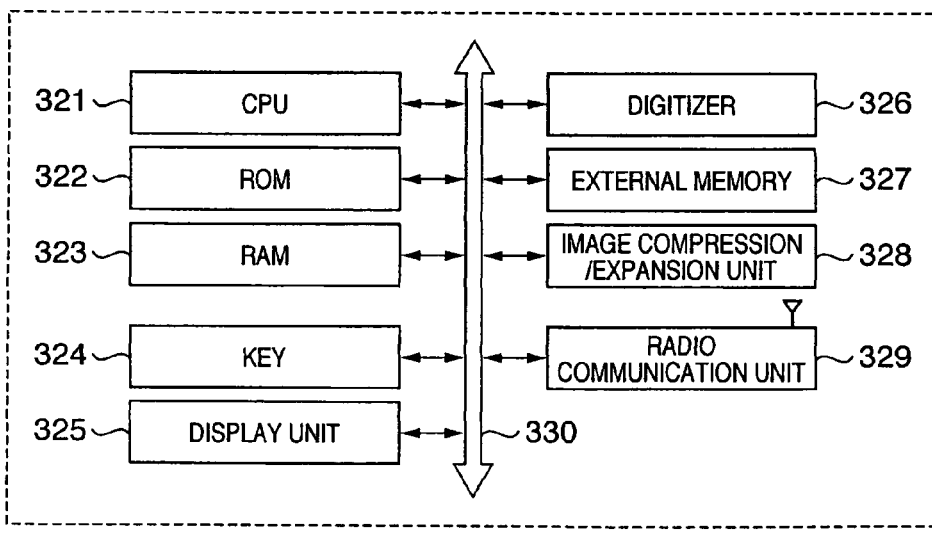

FIGS. 3A and 3B show the internal arrangements of the image capturing apparatus 101 and the display device 201.

FIG. 3A is a block diagram showing the internal arrangement of the image capturing apparatus 101.

Referring to FIG. 3A, the image capturing apparatus 101 has a CPU 301 to control the overall operation and perform an arithmetic process, a nonvolatile memory (ROM) 302 which records a program code and bitmap data such as an icon, a random access memory (RAM) 303 which temporarily saves work data, a button (KEY) 304 which allows the user to execute operations, a display unit 305 to display an operation window, a viewfinder image, or a saved captured image, a photoelectric conversion unit 306 to convert light having passed through a lens 307 into an electrical signal, an image compression unit 308 to compress captured still image data or moving image data, a radio communication unit 309 to communicate a viewfinder image or control data with the display device 201, an external memory 310 to save captured image data, a microphone 311 to receive external sound as an audio signal, a timer 312 to count time, and a bus 313 to transmit these electrical signals.

A liquid crystal display unit is adopted as the display unit 305 to reduce its mounting volume. For example, a CCD or a CMOS sensor can be adopted as the photoelectric conversion unit 306. A CF card (compact flash® card) is adopted as the external memory 310. The timer 312 has the following mechanism. That is, when an initial value is set to start the timer 312, it periodically counts down from the set value. As this value becomes zero, the timer 312 ends time counting and sends an interruption signal to the CPU 301. How to use the timer 312 will be described in detail in the second embodiment.

To capture a still image, RGB frame data having a VGA (Video Graphics Array) size (640×480 dot), which is acquired from the photoelectric conversion unit 306 at a frame rate of 30 frames/sec is digitally processed by the CPU 301. The processed data is subjected to AE (Automatic Exposure) and a correction process such as white balance to generate YUV digital image data. The YUV is a method of expressing colors by a luminance (Y) signal and two chromaticity values, i.e., a color difference of red (U) and a color difference of blue (V).

The generated YUV digital image data is compressed into an MPEG4 format by the image compression unit 308. The MPEG4 bitstream data is transmitted, as viewfinder image data, to the display device 201 via the radio communication unit 309. Simultaneously, the YUV digital data is further converted into RGB digital data, and then input to the display unit 305. The input data is displayed as a local viewfinder image.

At this time, upon receiving a capture instruction from the display device 201 via the radio communication unit 309 or through the operation of the shutter button 103, the image capturing apparatus 101 switches the size of the frame data output from the photoelectric conversion unit 306 to a set still image size (e.g., UXGA). RGB frame data corresponding to one frame is similarly processed. YUV digital image data having a UXGA size thus generated is compressed into a JPEG format by the image compression unit 308. The compressed data is saved in the external memory 310 as a JPEG image file.

FIG. 3B shows the internal arrangement of the display device 201.

Referring to FIG. 3B, the display device 201 has a CPU 321 to control the overall operation and perform an arithmetic process. The display device 201 also has a nonvolatile memory (ROM) 322 which records a program code and bitmap data such as an icon. The display device 201 also has a random access memory (RAM) 323 which temporarily saves the work contents. The display device 201 also has a button (KEY) 324 which allows the user to execute operations. The display device 201 also has a display unit 325 to display a saved image or a viewfinder image transmitted from the image capturing apparatus 101 by radio communication.

The display device 201 also has a digitizer 326 attached to the surface of the display unit 325 so as to allow the user to use it as an operation unit by generating an electrical signal upon touching the display unit 325 with a pen. The display device 201 also has an external memory 327 to save data such as a still image and a moving image. The display device 201 also has an image compression/expansion unit 328 to compress/expand the still image and moving image. The display device 201 also has a radio communication unit 329 to communicate an image or control data with the image capturing apparatus 101, and a bus 330 to transmit these electrical signals.

The display unit 325 is constituted by a liquid crystal display unit to reduce its mounting volume. A CF card (compact flash® card) is adopted as the external memory. As the radio communication units 309 and 329, IEEE 802.11X is adopted in this embodiment because this scheme satisfies a band width large enough to allow the image capturing apparatus 101 and the display device 201 to communicate with each other. IP communication in an ad hoc mode is done on the IEEE 802.11.

Figure 4:
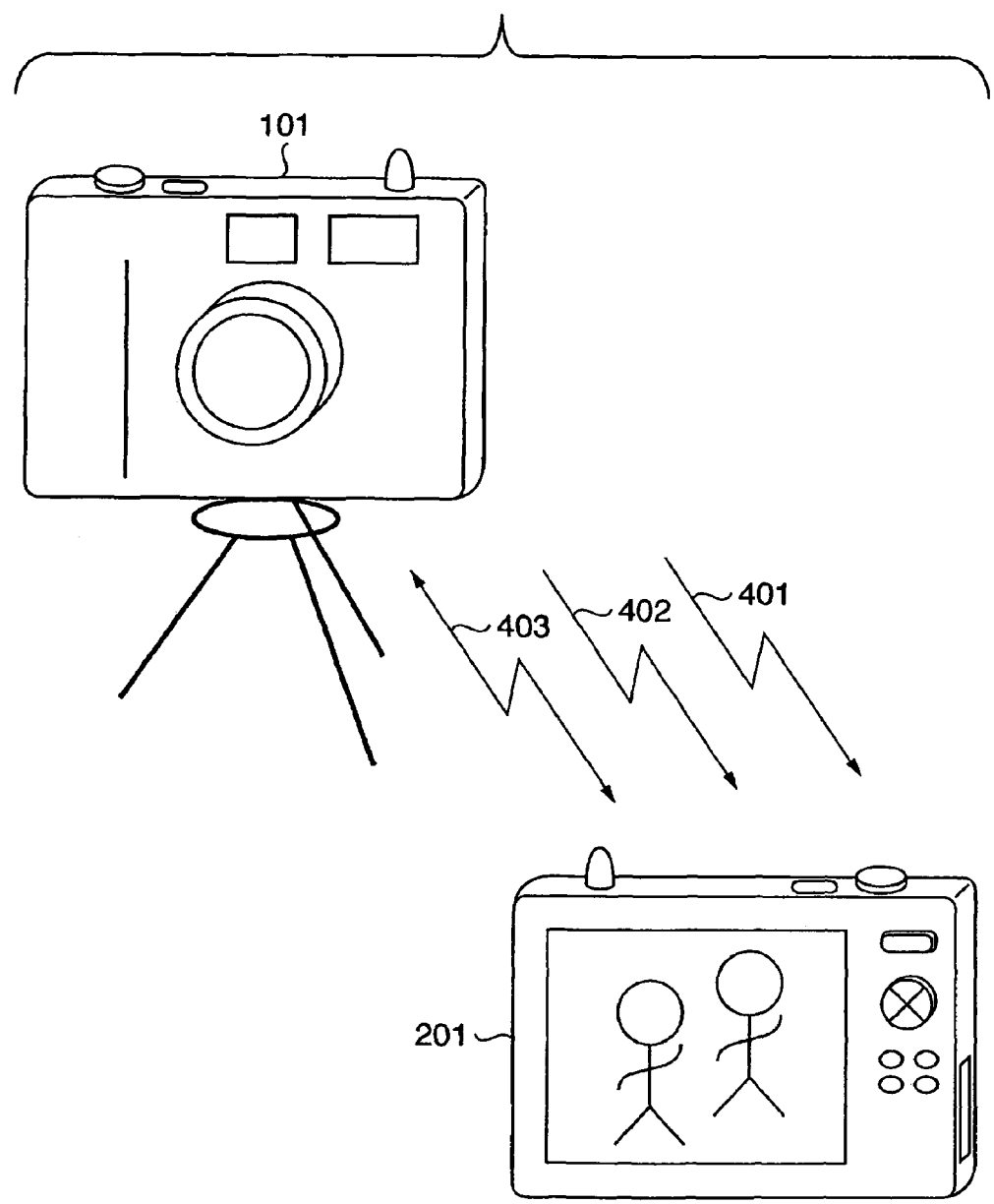
FIG. 4 is a view representing data exchange using radio communication according to the preferred first embodiment of the present invention.

FIG. 4 is a view representing data exchange between the image capturing apparatus 101 and the display device 201 using radio communication according to this embodiment. Referring to FIG. 4, viewfinder image data 401 is transmitted from the image capturing apparatus 101 to the display device 201. Bitstream data of a compressed moving image having a VGA size, which is captured by the image capturing apparatus 101 during the image capturing operation is continuously transferred, as the viewfinder image data, to the display device 201. To minimize a data delay, this viewfinder image data is not retransmitted even when an error occurs in a communication packet.

Saved image data 402 transmitted from the image capturing apparatus 101 to the display device 201 is captured still image data compressed into a JPEG format. This captured data is normally saved in the external memory 310 provided in the image capturing apparatus 101. However, if the display device 201 has issued a transfer request, this data is transferred.

Although this data need not represent real-time data, it must not be destroyed or lost. To avoid such an accident, if an error occurs in a communication packet, data transfer is done using a protocol for retransmitting the packet suffering the error.

A control command 403 for device control is exchanged between the image capturing apparatus 101 and the display device 201. Such device control includes, e.g., control of the image capturing apparatus 101 during the image capturing operation for the settings of capturing conditions such as a zoom, a stop, the compression ratio, and the number of pixels, and for a response to a transfer request of viewfinder data or captured data. The control command 403 includes a command to cause the display device 201 to power on/off the image capturing apparatus 101 by remote control. The viewfinder image data 401, the saved image data 402, and the control signal 403 are simultaneously, independently, and asynchronously transferred.

Figure 5:
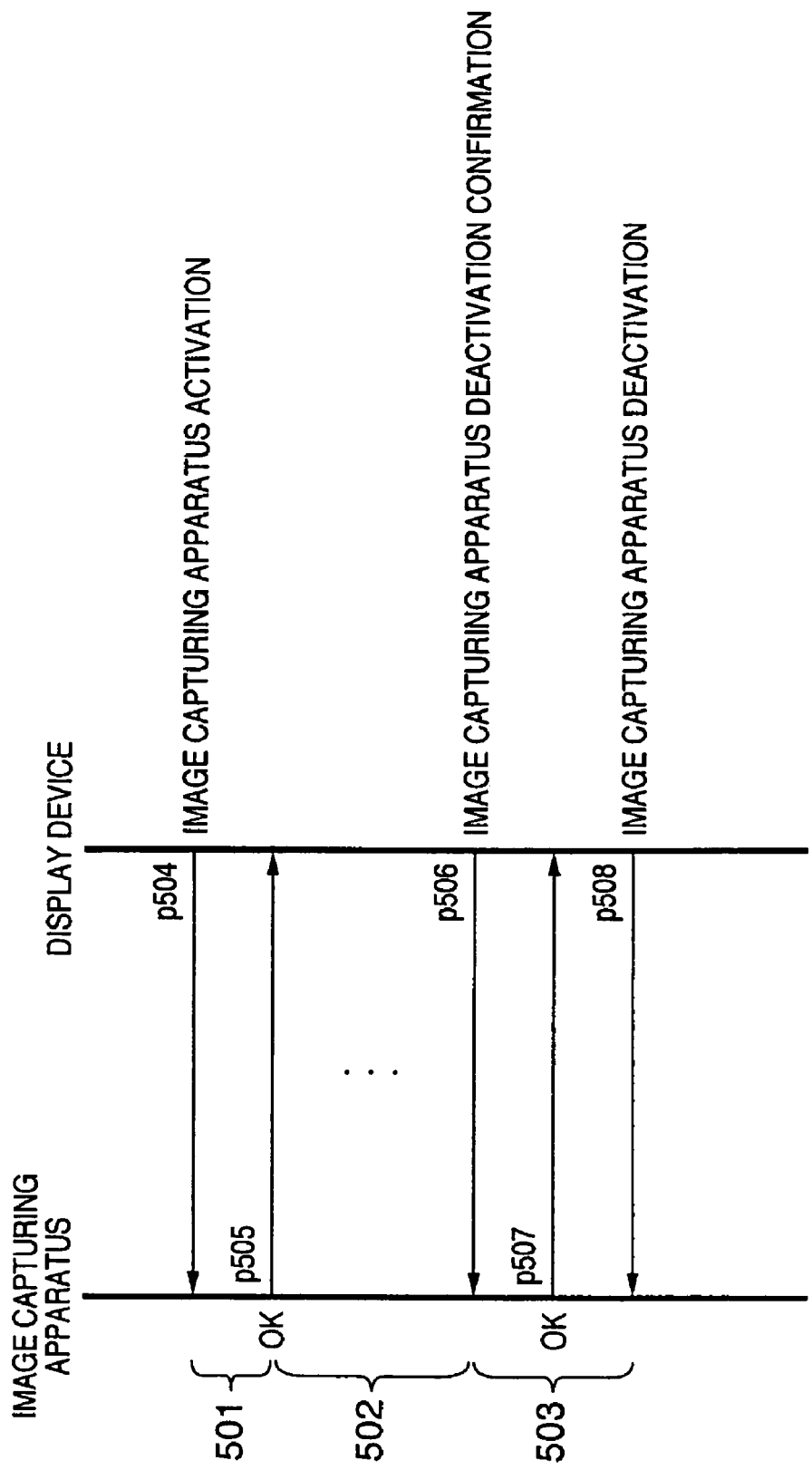
FIG. 5 is a diagram showing the radio communication processing sequence according to the preferred first embodiment of the present invention.

FIG. 5 shows an example of the radio communication processing sequence when the display device 201 powers ON/OFF the image capturing apparatus 101 by remote control. In this case, a power ON state of the image capturing apparatus 101 is a state in which all the devices are active and image capturing is possible. A power OFF state is a state in which only communication command reception is possible and all unrelated devices are set in a sleep state, i.e., a radio communication waiting state of minimizing power consumption.

Referring to FIG. 5, a first process 501 is a sequence process for causing the display device 201 to activate the image capturing apparatus 101 by remote control. A second process 502 is a sequence process in an image capturing process. A third process 503 is a sequence process for causing the display device 201 to deactivate the image capturing apparatus 101 by remote control.

The image capturing apparatus 101 and the display device 201 are initially set in an OFF (radio communication waiting) state and ON (active) state, respectively. At a point p504, the display device 201 transfers a power supply activation instruction command to the image capturing apparatus 101. Upon receiving this command, the image capturing apparatus 101 shifts to an ON (active) state. At a point p505, the image capturing apparatus 101 returns an OK command to confirm that it has received this command. Upon receiving the OK command, the display device 201 shifts to the image capturing process as the second process.

In the second process 502, the image capturing apparatus 101 transmits viewfinder image data and a saved image to the display device 201. The display device 201 transmits a control command to the image capturing apparatus 101. In the third process 503, to power off the image capturing apparatus 101, the display device 201 transfers a power supply deactivation confirmation command to the image capturing apparatus 101 at a point p506. Upon receiving this command, the image capturing apparatus 101 returns, to the display device 201 at a point p507, an "OK" command to confirm that it has received this command.

Upon receiving this command, the display device 201 determines that the image capturing apparatus 101 is ready for power supply deactivation by remote control, and transfers, at a point p508, a power supply deactivation instruction command. Upon receiving this command, the image capturing apparatus 101 deactivates itself and shifts to an OFF (radio communication waiting) state.

Figure 6:
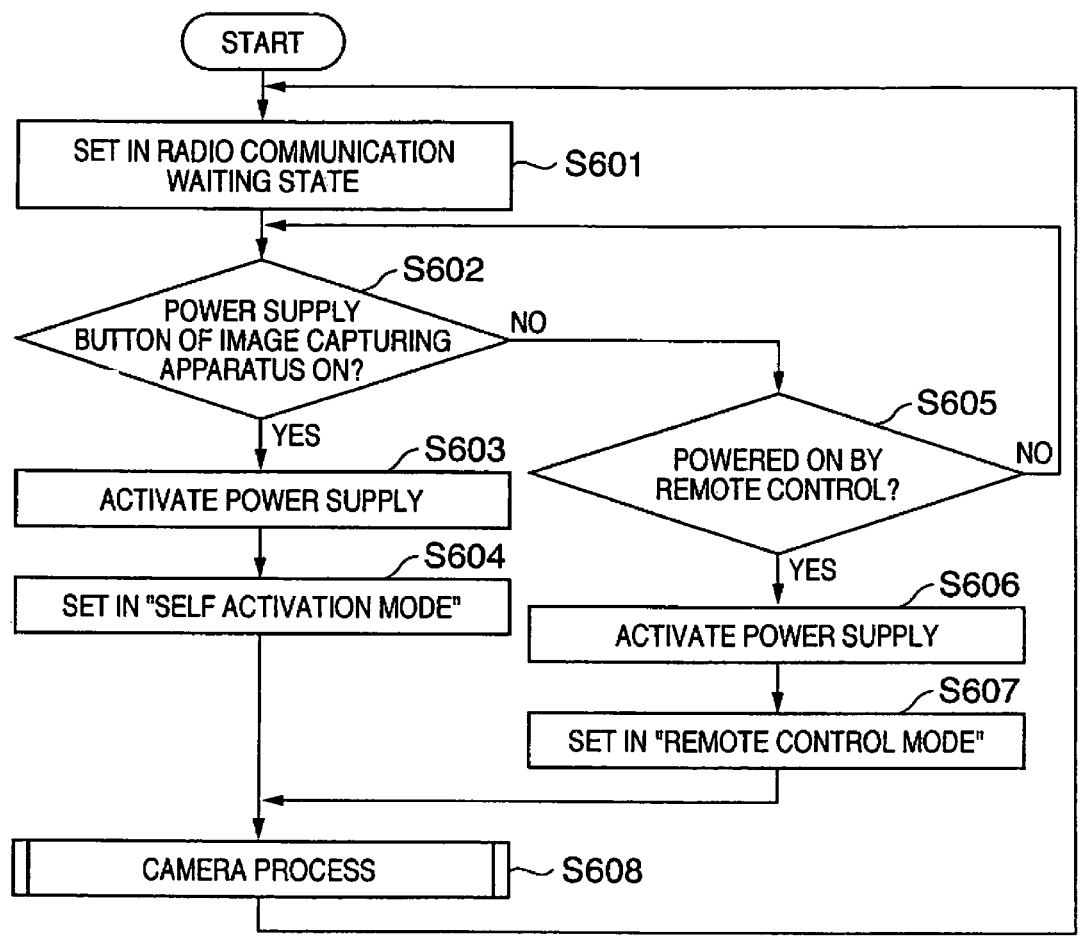
FIG. 6 is a flowchart for explaining an example of the processing procedures of the overall moving image/still image capturing operation in the image capturing apparatus according to the preferred first embodiment of the present invention.
Figure 7:
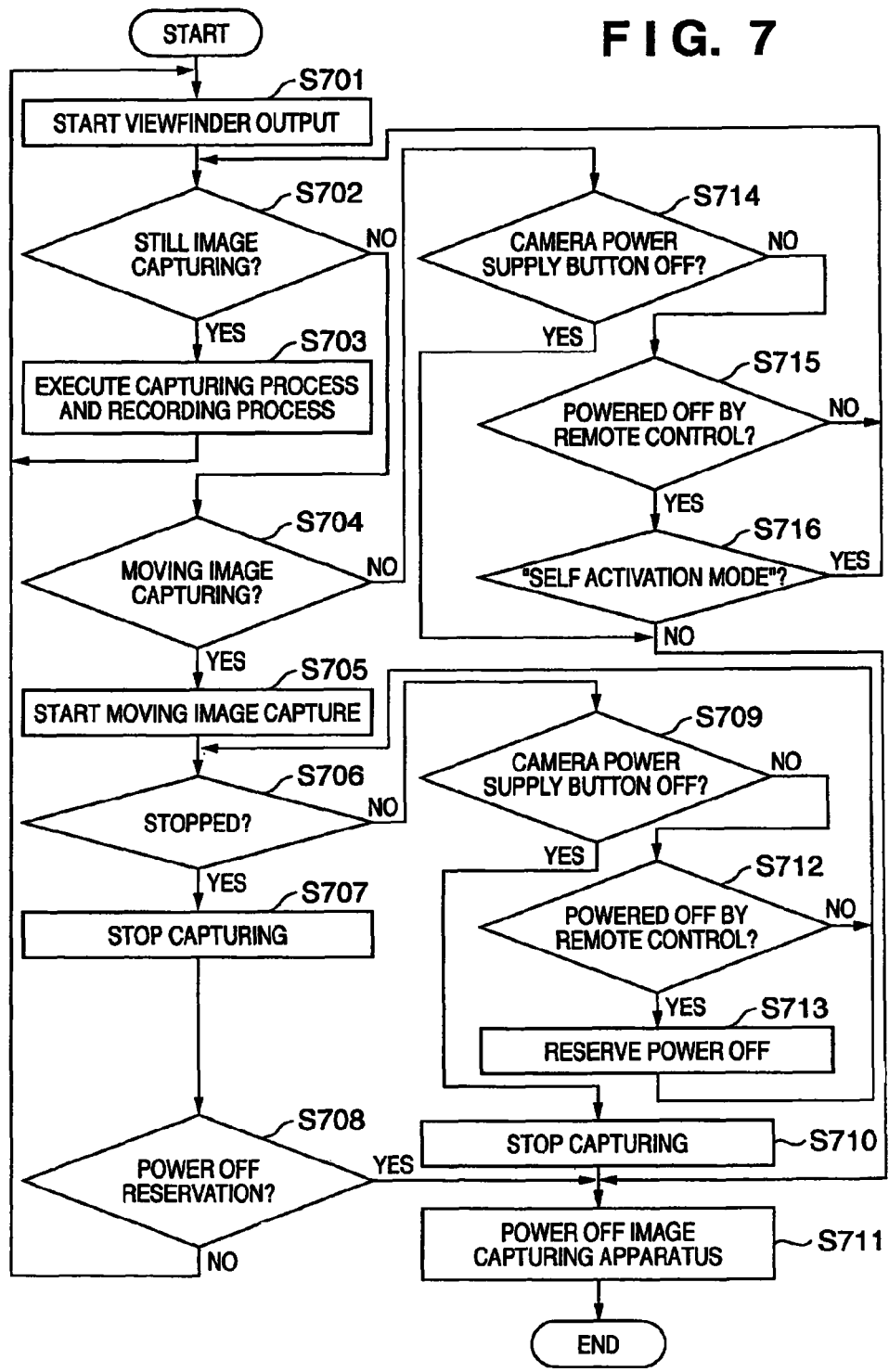
FIG. 7 is a flowchart showing a camera process according to the preferred first embodiment of the present invention.
Figure 8:
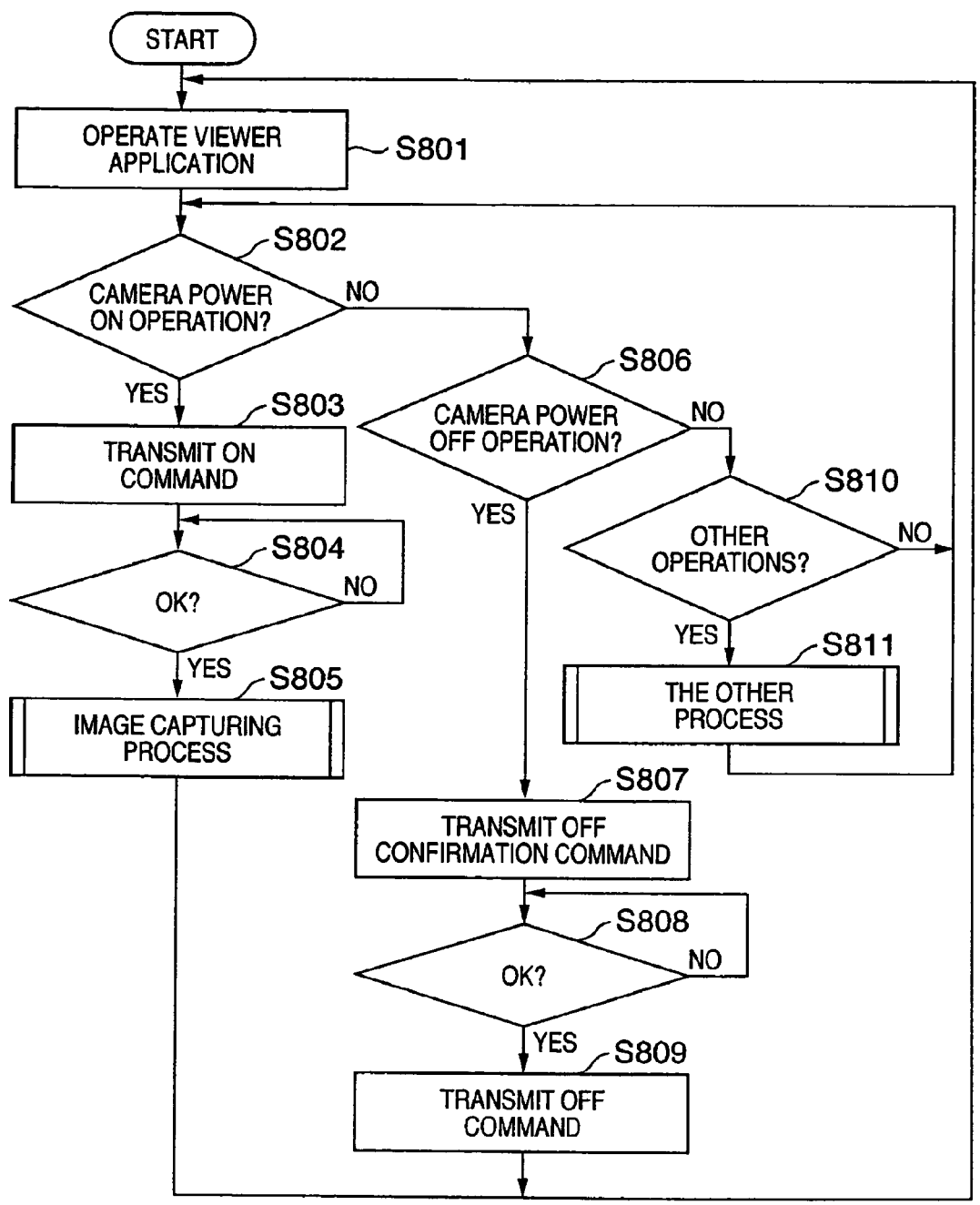
FIG. 8 is a flowchart for explaining an example of the processing procedures of the overall moving image/still image capturing operation in the display device according to the preferred first embodiment of the present invention.

Details of a still image/moving image capturing process by the image capturing apparatus 101 and the display device 201 according to the first embodiment will be described below. FIGS. 6 and 7 show the processes in the image capturing apparatus 101. FIG. 8 shows the process in the display device 201.

FIG. 6 is a flowchart showing details of the process of the overall moving image/still image capturing operation in the image capturing apparatus 101.

Referring to FIG. 6, in step S601, the image capturing apparatus 101 is set in the radio communication waiting state described with reference to FIG. 5. Although the whole image capturing apparatus 101 is OFF in this state, it can receive a command from the display device 201 by radio communication.

In step S602, it is determined whether the power supply button 102 attached to the image capturing apparatus 101 is pressed. If YES in step S602, the image capturing apparatus 101 is activated in step S603 to enable a normal operation. In step S604, the image capturing apparatus 101 is set in a "self activation mode" as an operation mode, which indicates that the power supply has been activated by the attached power supply button.

In step S608, the flow advances to a camera process including a moving image/still image capturing process. Details of the camera process will be described with reference to FIG. 7. When the camera process in step S608 is complete, i.e., when the image capturing apparatus 101 is powered off, the flow returns to the radio communication waiting state in step S601 again.

If NO in step S602, it is determined in step S605 whether the power supply is turned on by remote control. If NO in step S605, the radio communication waiting state continues and the process returns to step S602. If YES in step S605, the flow advances to step S606 to activate the image capturing apparatus 101, like in the process in step S603 to enable a normal operation. The power ON process by remote control executes the sequence process represented by the first process 501 in FIG. 5.

The flow then advances to step S607 to set the image capturing apparatus 101 in a "remote control mode" as an operation mode, which indicates that the display device 201 has activated the power supply by remote control. When the "remote control mode" is complete, the flow advances to the camera process in step S608.

FIG. 7 is a flowchart for explaining details of the contents of the camera process (step S608), which have been described with reference to the flowchart in FIG. 6. Referring to FIG. 7, a viewfinder output process is performed in step S701. As described with reference to FIG. 3A, the viewfinder output process includes local display, on the display unit 305, of viewfinder image data converted into YUV digital data, and radio transmission of bitstream data compressed into an MPEG4 format.

In step S702, it is determined whether the still image capturing operation is executed, i.e., whether the shutter button 103 is pressed, or whether the display device 201 has issued a still image capture instruction via the radio communication unit 309.

If YES in step S702, in step S703, a still image capturing process and a process for recording the captured still image data in the external memory 310 are executed. As described with reference to FIG. 3A, in the still image capturing process, RGB frame data corresponding to one frame, which is output from the photoelectric conversion unit 306 is processed, and YUV digital image data thus generated is compressed into a JPEG format. When the still image capturing process is complete, the flow returns to the viewfinder output process in step S701 again.

If NO in step S702, the flow advances to step S704. In step S704, it is determined whether the moving image capturing start operation is executed, i.e., whether the shutter button 103 is pressed, or whether the display device 201 has issued a moving image capturing start instruction via the radio communication unit 309. If YES in step S704, in step S705, a moving image capturing process and a process for recording the captured moving image data in the external memory 310 are started.

The moving image capturing process multiplexes video bit stream data and audio bit stream data to create capturing moving image data. Moving image data acquired from the photoelectric conversion unit 306 at a frame rate of 30 frames/sec and converted into YUV digital data is compressed into an MPEG4 format by the image compression unit 308 to generate the video bit stream data. Audio data acquired by the attached microphone 311 is subjected to speech compression by the CPU 301 to generate audio bit stream data.

In step S706, it is determined whether the moving image capturing stop operation, i.e., the stop operation performed in response to pressing of the button attached to the image capturing apparatus 101 is executed, or whether the display device 201 has issued a moving image capturing stop instruction via the radio communication unit 309, during the moving image capturing process.

If YES in step S706, in step S707, the moving image capturing process and the process for recording the captured moving image data in the external memory 310 are stopped. The data captured until now remain as captured image files in the external memory.

In step S708, it is determined whether power OFF is reserved. The term "Power OFF reservation" means reserving an operation for deactivating the power supply at the end of the image capturing process instead of deactivating the power supply immediately after the display device 201 has issued a power OFF instruction by remote control via the radio communication unit during the moving image capturing process.

If YES in step S708, the flow advances to step S711 to deactivate the image capturing apparatus 101 and escape from the processing flow shown in FIG. 7. If NO in step S708, the flow returns to step S701 to perform the viewfinder output process again.

If NO in step S706, it is determined in step S709 whether the image capturing apparatus 101 is powered off by pressing the power supply button 102 attached thereto.

If YES in step S709, the moving image capturing process is stopped in step S710, like in step S707. The image capturing apparatus 101 is deactivated in step S711 to escape from the processing flow shown in FIG. 7.

If NO in step S709, the flow advances to step S712. In step S712, it is determined whether the power supply is deactivated by remote control via the radio communication unit. If NO in step S712, a state of waiting for the operations subsequent to the determination in step S706 continues again.

If YES in step S712, power OFF reservation is set as an internal mode in step S713 instead of immediately deactivating the power supply.

As described above, the term "power OFF reservation" means reserving an operation for inhibiting power supply deactivation by remote control during the image capturing operation and deactivating the power supply after the image capturing operation. During operation reservation, the power supply is deactivated immediately after the moving image capturing stop process is completed in step S707. When the power OFF reservation process in step S713 is complete, a state of waiting for the operations subsequent to step S706 continues again.

If NO in step S704, the flow advances to step S714. In step S714, it is determined whether the image capturing apparatus 101 is powered off by pressing the power supply button 102 attached thereto. If YES in step S714, the image capturing apparatus 101 is deactivated in step S711 to escape from the processing flow.

If NO in step S714, the flow advances to step S715. In step S715, it is determined whether the power supply is deactivated by remote control via the radio communication unit. If NO in step S715, a state of waiting for the operations subsequent to determination in step S702 continues again.

If YES in step S715, it is determined in step S716 whether the image capturing apparatus 101 is kept in the "self activation mode" set in step S604 of FIG. 6. If YES in step S716, power supply deactivation by remote control is inhibited. Therefore, a state of waiting for the operations subsequent to step S702 continues again instead of a power supply deactivation process.

If NO in step S716, i.e., if a "remote control mode" is set, the image capturing apparatus 101 accepts power supply deactivation by remote control and the image capturing apparatus 101 is deactivated in step S711 to escape from the processing flow in FIG. 7.

FIG. 8 is a flowchart showing details of the process of the overall moving image/still image capturing operation in the display device 201. Referring to FIG. 8, an application installed in the display device 201 is executed in step S801. This application is one other than a capturing application by remote control using the image capturing apparatus 101.

When the application executed in step S801 is complete, the flow advances to step S802 to determine whether an operation for activating the image capturing apparatus 101 by remote control is executed.

If YES in step S802, a power supply activation command is transmitted to the display device 201 via the radio communication unit 329. When transmission is complete, an OK command indicating that the display device 201 has received the command is waited for in step S804.

At this time, receiving the OK command means that the image capturing apparatus 101 has normally been activated. In step S805, an image capturing process is executed by remote control. A series of power supply activation processes complies with the same flow of steps as that of the sequence described in the first process 501 of FIG. 5. The image capturing process in step S805 includes a process for causing the display unit 325 to receive and display viewfinder output data transmitted from the image capturing apparatus 101 via the radio communication unit. This process also includes a process for transmitting various camera control commands to the image capturing apparatus 101 using the operation button 324 and the digitizer 326 on the display device 201. This process also includes a process for transmitting a capture instruction command to start still image/moving image capturing. When the image capturing process in step S805 is complete, the flow returns to application execution in step S801 again.

If NO in step S802, it is determined in step S806 whether the power supply deactivation operation by remote control is executed. If YES in step S806, in step S807, a power supply deactivation confirmation command is transmitted to the display device 201 via the radio communication unit 329.

At this point, the display device 201 cannot confirm whether the command has been received by the image capturing apparatus 101. Therefore, in step S808, an OK command indicating that the display device 201 has received the command is waited for. When the display device 201 has received the OK command, it is possible to deactivate the image capturing apparatus 101 by remote control and in step S809, a power supply deactivation instruction command is transmitted to the image capturing apparatus 101.

A series of power supply deactivation processes complies with the same flow as that of the sequence described as the third process 503 in FIG. 5. When power supply deactivation command transmission is complete in step S809, the flow returns to application execution in step S801 again.

If NO in step S806, it is determined in step S810 whether other functions are operated. If NO in step S810, the flow returns to the operation waiting loop from step S802 again. The other functions are the functions other than the applications installed in the display device 201. For example, these functions include setting the overall operation environment of the display device 201 such as radio communication. If YES in step S810, the process of the other function is executed in step S811. When the process is complete, the flow returns to the operation waiting loop from step S802 again.

Second Embodiment

In the above-described first embodiment, the display device 201 transmits a power OFF command to the image capturing apparatus 101 immediately after it deactivates the power supply. Upon receiving this command, the image capturing apparatus 101 automatically deactivates itself. With this operation, the image capturing apparatus 101 is deactivated in synchronism with the display device 201. However, the present invention is not limited to this.

In the second embodiment, an image capturing apparatus 101 is deactivated in synchronism with a display device 201 by always causing the display device 201 to monitor the power supply state of the image capturing apparatus 101. Furthermore, when the display device 201 has moved outside the radio communication range and remains there for a long time, the image capturing apparatus 101 is also automatically deactivated.

FIG. 9 shows an example of the radio communication processing sequence when the display device 201 activates/deactivates the image capturing apparatus 101 by remote control in the second embodiment. Power ON and OFF states of the image capturing apparatus 101 are the same as those described with reference to FIG. 5. Similarly, a power ON state of the display device 201 indicates a state in which all the devices are active and application execution is possible. A power OFF state of the display device 201 indicates a state in which only communication command reception and a status response to the command are possible, and all unrelated devices are set in a sleep state, i.e., a radio communication waiting state of minimizing power consumption.

Referring to FIG. 9, a first sequence process 901 causes the display device 201 to power on the image capturing apparatus 101 by remote control. A second sequence process 902 is done in application execution. A third sequence process 903 deactivates the image capturing apparatus 101 by remote control.

The image capturing apparatus 101 and the display device 201 are initially set in an OFF (radio communication waiting) state and ON (active) state, respectively. At a point p904, the display device 201 transfers a power supply activation instruction command to the image capturing apparatus 101.

Upon receiving this command, the image capturing apparatus 101 shifts to an ON (active) state. At a point p905, the image capturing apparatus 101 returns an OK command to confirm that it has received this command. Upon receiving the OK command, the display device 201 shifts to the second sequence process (image capturing process) 902. The sequence up to here includes the same processes as those at the points p504 and p505. The second sequence process 902 is the same as the second process 502 in FIG. 5.

In the third sequence process 903, when the image capturing apparatus 101 is to be powered off, a command to inquire the power supply state of the display device 201 is transferred to the display device 201 at a point p906.

Upon receiving this command, the display device 201 transmits an ON notification command to the image capturing apparatus 101 if the display device 201 is ON (point p907). If the display device 201 is OFF, it transmits an OFF notification command to the image capturing apparatus 101 (point p908). Upon receiving the response command, the image capturing apparatus 101 deactivates itself.

Details of a still image/moving image capturing process of the image capturing apparatus 101 according to the preferred second embodiment of the present invention will be described below. The detailed flowchart of the overall image capturing operation in the image capturing apparatus 101 complies with the same processing flow as that described with reference to FIG. 6 in the first embodiment. A process in the display device 201 is shown in the sequence of FIG. 9.

FIG. 10 is a flowchart for explaining details of the contents of processing operations according to the second embodiment in the camera process (step S608) which have been described with reference to the flowchart of FIG. 6. Referring to FIG. 10, an initial value corresponding to a time counting end time is initially set in a timer 312. At this time, the timer is not started.

A viewfinder output process in step S1001, a still image capturing operation determination process in step S1002, and a still image capturing process in step S1003 are the same as those in steps S701, S702, and S703, respectively. The processes in steps S701, S702, and S703 have been described in the first embodiment. When the still image capturing process is complete, the flow returns to the viewfinder output process in step S1001 again.

If it is determined in step S1002 that the still image capturing operation is not appropriate, the flow advances to step S1004. In step S1004, it is determined whether the moving image capturing start operation is executed, i.e., a shutter button 103 is similarly pressed, or whether the display device 201 has issued a moving image capturing start instruction via a radio communication unit 309.

If YES in step S1004, in step S1005, a moving image capturing process and a process for recording the captured moving image data in an external memory 310 are started. This moving image capturing process is the same as that described in step S705 of FIG. 7, and multiplexes video bit stream data and audio bit stream data to create capturing moving image data.

In step S1006, which follows step S1005, it is determined whether the moving image capturing stop operation, i.e., the stop operation by the button attached to the image capturing apparatus 101 is executed, or whether the display device 201 has issued a moving image capturing stop instruction via the radio communication unit 309, during the moving image capturing process.

If YES in step S1006, in step S1007, the moving image capturing process and the process for recording the captured moving image data in the external memory 310 are stopped. The data captured until now remain as captured image files in the external memory. After that, the flow returns to step S1001 to perform the viewfinder output process again.

If NO in step S1006, it is determined in step S1008 whether the image capturing apparatus 101 is powered off by pressing a power supply button 102 attached thereto.

If YES in step S1008, the moving image capturing process is stopped in step S1009, like in step S1007. The image capturing apparatus 101 is deactivated in step S1010 to escape from the processing flow. If NO in step S1008, a state of waiting for the operations subsequent to step S1006 continues again.

If NO in step S1004, it is determined in step S1011 whether the image capturing apparatus 101 is powered off by pressing the power supply button 102 attached thereto. If YES in step S1011, the image capturing apparatus 101 is deactivated in step S1010 to escape from the processing flow.

If NO in step S1011, it is determined in step S1012 whether the timer 312 has ended time counting. If YES in step S1012, the image capturing apparatus 101 is deactivated in step S1010 to escape from the processing flow in FIG. 10. As the timer count value becomes zero, i.e., the timer 312 ends time counting, it sends an interruption to the CPU 301. Upon receiving this interruption, the CPU 301 turns on a time counting end flag. To determine whether time counting has ended, this flag is checked.

If NO in step S1012, whether the display device 201 is ON or OFF is inquired in step S1013. This process complies with the sequence described in the third sequence process 903 of FIG. 9. If the display device 201 is ON, an ON notification command is returned. If display device 201 is OFF, an OFF notification command is returned.

After step S1013, step S1014 follows. If YES in step S1014, it is determined in step S1015 whether the image capturing apparatus 101 is kept in the "self activation mode" set in step S604 of FIG. 6.

If YES in step S1015, power supply deactivation by remote control is inhibited. Therefore, a state of waiting for the operations subsequent to step S1002 continues again instead of a power supply deactivation process. If NO in step S1015, i.e., if a "remote control mode" is set, the image capturing apparatus 101 accepts power supply deactivation by remote control and the image capturing apparatus 101 is deactivated in step S1010 to escape from the processing flow.

If NO in step S1014, it is determined in step S1016 whether power ON is notified. If YES in step S1016, the timer 312 is stopped in step S1017. After that, a state of waiting for the operations subsequent to step S1002 continues again.

If NO in step S1016, the image capturing apparatus 101 and display device 201 cannot normally execute radio communication. That is, the display device 201 is regarded to be positioned outside the communication range when seen from the image capturing apparatus 101. As a result, step S1018 follows. In step S1018, the timer 312 is initialized and starts counting. A state of waiting for the operations subsequent to step S1002 continues. A series of processes from step S1013 to step S1018 realizes control to automatically deactivate the image capturing apparatus 101 when the image capturing apparatus 101 and display device 201 fail communication for a predetermined time, e.g., when they have temporarily moved outside the communication range.

Third Embodiment

In the first and second embodiments described above, the image capturing apparatus 101 and display device 201 communicate with each other in a separated state to realize a still image/moving image capturing application. However, the present invention is not limited to this.

In the third embodiment, not only a capturing application is executed while an image capturing apparatus and display device are separated, but also a structure capable of integrating the image capturing apparatus 101 and display device is attained. Data transfer between these apparatuses can be done by a wired unit physically connected therebetween.

Figure 11A:
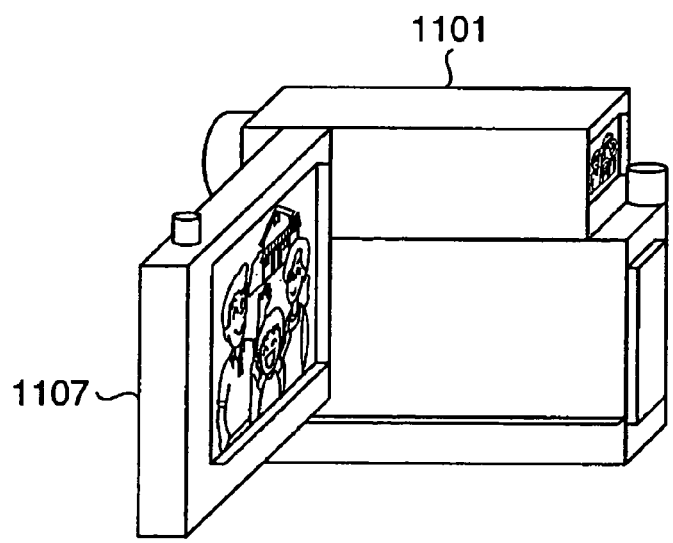
FIGS. 11A and 11B are views showing the outer appearances of an image capturing apparatus and display device according to the preferred third embodiment of the present invention.
Figure 11B:
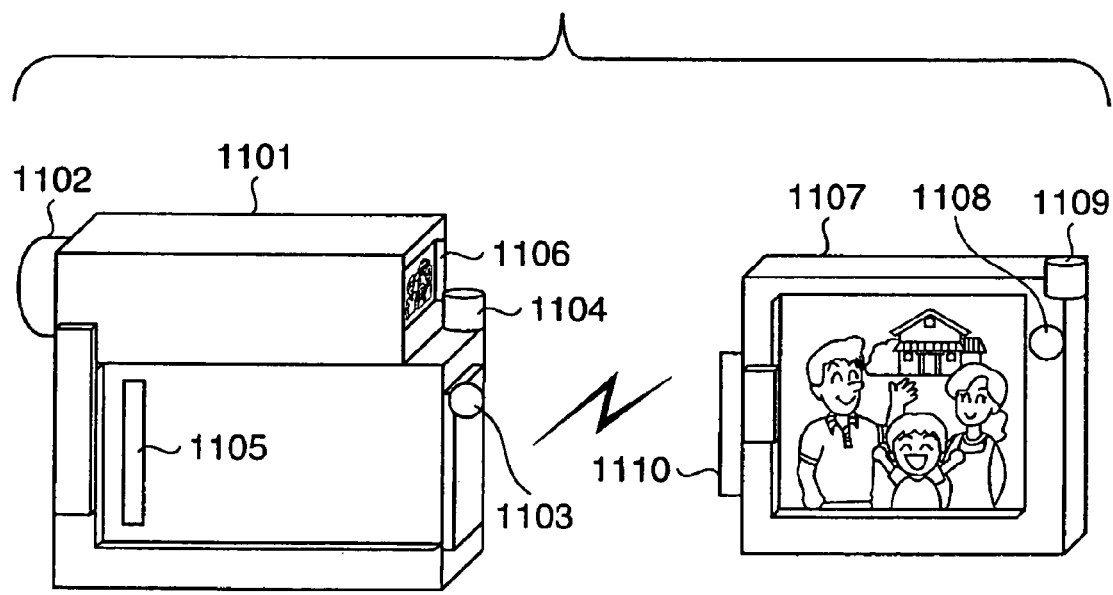

FIGS. 11A and 11B are views showing the outer appearance of a radio communication camera according to the third embodiment. FIG. 11A shows a state in which an image capturing apparatus 1101 and display device 1107 are separated. FIG. 11B shows a state in which the image capturing apparatus 1101 and display device 1107 are connected and integrated. The image capturing apparatus 1101 comprises a lens 1102, a power supply button 1103, a radio communication antenna 1104, a connector 1105 which connects with the display device 1107, and an electronic viewfinder (EVF) 1106. As shown in FIGS. 11A and 11B, the display device 1107 comprises a power supply button 1108, a radio communication antenna 1109, and a connector 1110 which connects with the image capturing apparatus 1101.

The image capturing apparatus 1101 and display device 1107 are connected by coupling their connectors 1105 and 1110. This makes it possible to transfer signals via the terminals of the connectors. Data exchange between the image capturing apparatus 1101 and the display device 1107 is thus achieved.

When the image capturing apparatus 1101 and display device 1107 are used in a separated state as shown in FIG. 11B, data transfer is done using their respective radio communication units. When the image capturing apparatus 1101 and display device 1107 are used in an integrated state as shown in FIG. 11A, data transfer is done via the above connectors.

Figure 12:
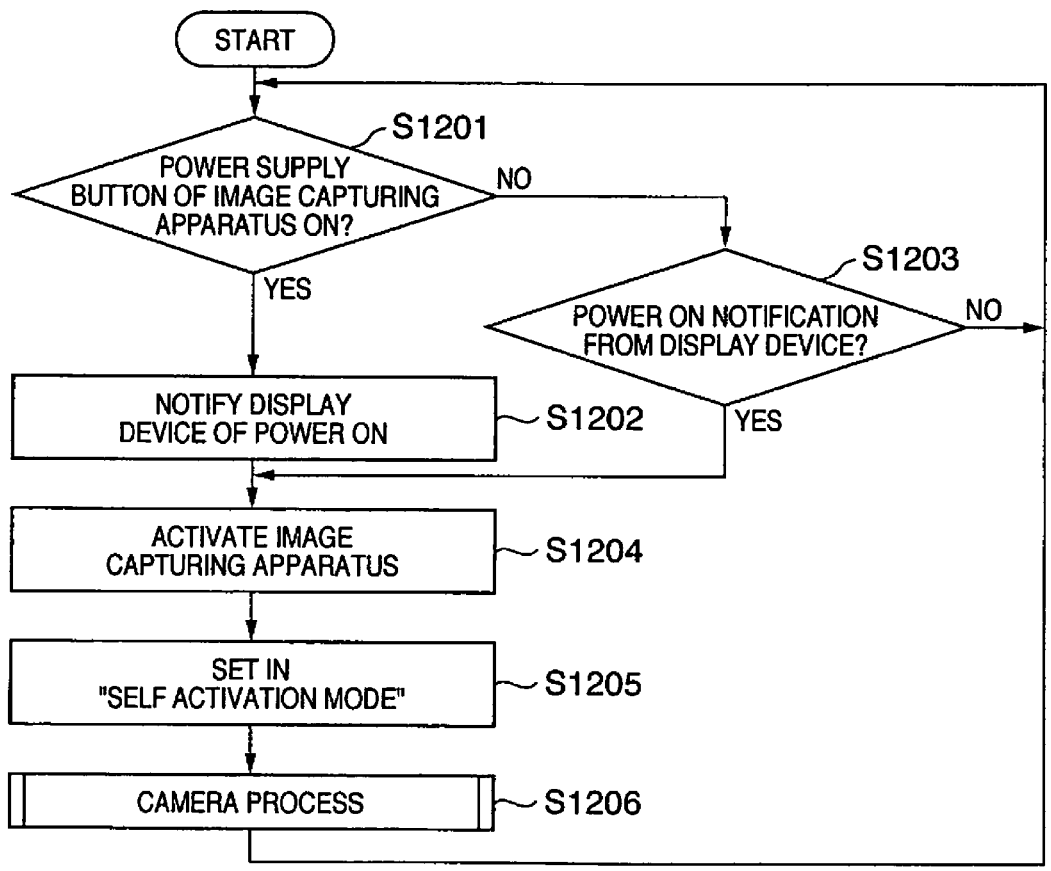
FIG. 12 is a flowchart for explaining an example of the processing procedures of the overall moving image/still image capturing operation in the image capturing apparatus according to the preferred third embodiment of the present invention.

FIG. 12 is a flowchart for explaining details of the processing procedures of the overall still image/moving image capturing operation in the image capturing apparatus 1101 when the image capturing apparatus 1101 and display device 1107 are used in an integrated state according to the third embodiment.

Referring to FIG. 12, it is checked in steps S1201 and S1203 whether the image capturing apparatus 1101 is activated.

When the image capturing apparatus 1101 and display device 1107 are integrated, two power supply activation methods are available. As one method, the power supply button 1103 of the image capturing apparatus 1101 is pressed. In this case, the image capturing apparatus 1101 is directly activated. As another method, the power supply button 1108 of the display device 1107 is pressed. In this case, the image capturing apparatus 1101 is activated upon receiving a power supply activation signal from the display device 1107. Either method has a mechanism of activating both the image capturing apparatus 1101 and display device 1107 even by pressing a power supply button of one side.

In step S1201, it is checked whether the power supply button 1103 of the image capturing apparatus 1101 is pressed. If YES in step S1201, to activate the display device 1107, the display device 1107 is notified of power supply activation using a signal transmitted via the connectors 1105 and 1110 in step S1202. Upon receiving this notification, the display device 1107 activates itself.

If NO in step S1201, it is checked in step S1203 whether the display device 1107 has notified of power supply activation, i.e., the power supply button 1108 of the display device 1107 is pressed. If YES in step S1203, the flow advances to step S1204. If NO in step S1203, the flow returns to step S1201 to repeat power supply activation checking.

In step S1204, the image capturing apparatus 1101 is activated to enable a normal operation and step S1205 follows. In step S1205, the "self activation mode" described with reference to FIG. 6 is set as an operation mode of the image capturing apparatus 1101. In the "self activation mode", the display device 1107 is inhibited from activating the power supply by remote control using the radio communication unit, as described in the first embodiment.

Step S1206 follows step S1205. In step S1206, the flow advances to a camera process including a moving image/still image capturing process. Details of the camera process are the same as those described with reference to the flowchart of FIG. 7 in the first embodiment. When the camera process in step S1206 is complete, i.e., the image capturing apparatus 1101 is powered off, the flow returns to the power supply activation checking process in step S1201 again.

As described above, as the processes in the flow described with reference to FIG. 12 are executed to activate the power supply while integrating the image capturing apparatus 1101 and display device 1107, a "self activation mode" is set. Therefore, while keeping a power ON state, even when the image capturing apparatus 1101 and display device 1107 are used in a separated state later, the display device 1107 cannot activate the power supply by remote control.

In the third embodiment, when the power supply is activated while the image capturing apparatus 1101 and display device 1107 are separated, the same operations as those in the flowchart described with reference to FIGS. 6, 7, and 8 in the first embodiment are executed. Furthermore, connecting, using the connectors, a separate image capturing apparatus and display device while they are used upon activating one side makes it possible to automatically activate the other side which is not activated.

This process can be realized by causing the activated apparatus to notify the non-activated apparatus of power supply activation using a signal transferred via the connectors 1105 and 1110, like in the process described in step S1202 of the flowchart in FIG. 12.

Other Embodiment

Units which form an image capturing apparatus and steps in a power supply control method for the image capturing apparatus according to the preferred embodiments of the present invention described above can be realized when programs stored in a RAM or ROM of a computer operate. The program and a computer-readable recording medium recording this program are incorporated in the present invention.

Moreover, the present invention can be practiced as, e.g., a system, apparatus, method, program, or recording medium. More specifically, the present invention can be applied to a system constituted by a plurality of devices, or to an apparatus comprising a single device.

The present invention is also achieved even by supplying a software program (in the embodiments, a program corresponding to the flowcharts shown in FIGS. 6, 7, 8, 10, and 12) which implements the functions of the above-described embodiments to the system or apparatus directly or from a remote site and causing the computer of the system or apparatus to read out and execute the supplied program code.

Hence, to implement the functional processing of the present invention by a computer, the program code itself, which is installed in the computer, also implements the present invention. That is, a computer program itself, which implements the functional processing of the present invention, is also incorporated in the present invention.

In this case, the program can take any form such as an object code, a program to be executed by an interpreter, or script data to be supplied to the OS as long as the functions of the program can be obtained.

As a recording medium to supply the program, for example, a floppy® disk, hard disk, optical disk, magneto optical disk, MO, CD-ROM, CD-R, CD-RW, magnetic tape, nonvolatile memory card, ROM, or DVD (DVD-ROM or DVD-R) can be used.

As another program supply method, a client computer may be connected to a homepage on the Internet using a browser in the computer, and the computer program itself of the present invention or a compressed file containing an automatic install function may be downloaded from the homepage to a recording medium such as a hard disk.

A program code that constitutes the program of the present invention may be divided into a plurality of files, and the files may be downloaded from different homepages. That is, a WWW server which causes a plurality of users to download a program file that causes a computer to implement the functional processing of the present invention is also incorporated in the present invention.

The program of the present invention may be encrypted, stored in a storage medium such as a CD-ROM, and distributed to users. Any user who satisfies predetermined conditions may be allowed to download key information for decryption from a homepage through the Internet, execute the encrypted program using the key information, and install the program in the computer.

The functions of the above-described embodiments are implemented not only when the readout program is executed by the computer but also when the OS or the like, which is running on the computer, performs part or all of actual processing based on the instructions of the program.

The functions of the above-described embodiments are also implemented when the program read out from the recording medium is written in the memory of a function expansion board inserted into the computer or a function expansion unit connected to the computer, and the CPU of the function expansion board or function expansion unit performs part or all of actual processing based on the instructions of the program.

As described above, when a display device activates an image capturing apparatus by remote control, the image capturing apparatus is automatically deactivated in synchronism with deactivation of the display device. Also, when the image capturing apparatus is activated by directly operating a power supply switch attached thereto, it inhibits the display device from executing the power supply operation by remote control. Since the image capturing apparatus can be automatically deactivated when the display device is kept unused, it is possible to prevent wasteful power consumption. This makes it possible to easily and mechanically attain power saving of the image capturing apparatus even when the image capturing apparatus is positioned beyond the user's grasp in capturing because, e.g., it is fixed to a tripod. Furthermore, it is possible to prevent an erroneous operation such as power supply deactivation by remote control even when the user executes the image capturing operation while holding the image capturing apparatus in hand.

Assume that the display device has activated the image capturing apparatus by remote control and has issued a power supply deactivation instruction to the image capturing apparatus. If the image capturing apparatus is performing capturing, it is deactivated upon waiting for image capturing operation completion. This makes it possible to prevent erroneous power supply deactivation during the moving image capturing operation. Since the power supply is deactivated after image capturing operation completion, power saving of the image capturing apparatus can be attained.

Assume also that the display device has activated the image capturing apparatus by remote control and it is detected that the display device has moved outside the radio communication range. If the display device does not return to the communication range within a predetermined time, the image capturing apparatus is deactivated. Therefore, when the image capturing apparatus is substantially kept unused, it is possible to deactivate the image capturing apparatus without causing the display device to issue a power supply deactivation instruction. Power saving of the image capturing apparatus can thus be realized.

When the image capturing apparatus and display device are connected and can be used even in an integrated state, if the power supply is activated in the integrated connected state and then they are used in a separated state, the image capturing apparatus rejects the power supply operation by remote control by the display device. This makes it possible to prevent erroneous power supply deactivation by remote control when the user executes the image capturing operation while holding the image capturing apparatus in hand.

When the image capturing apparatus and display device are used in a separated state, if they are integrated while keeping the power supply of one side ON, the power supply of the other side is automatically activated. This makes it possible to omit the power supply button ON operation, thus improving the operability.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-148540, filed May 20, 2005, which is hereby incorporated by reference herein in its entirety.

What is claimed is:

1. An image capturing apparatus which includes an image sensing unit and communicate with a remote controller, the image capturing apparatus comprising:

a direct power supply activation unit which activates the image capturing apparatus by activating power supply to the image capturing apparatus when a power supply button of the image capturing apparatus is operated by a user;

a remote power supply activation unit which activates the image capturing apparatus in response to an indication to activate power supply from the remote controller by activating power supply to the image capturing apparatus;

a receiving unit which receives an indication to deactivate power supply from the remote controller;

a determination unit which determines, when the receiving unit receives the indication to deactivate power supply from the remote controller, whether the image capturing apparatus is directly activated by the user operation of the power supply button of the image capturing apparatus or the image capturing apparatus is activated by the indication to activate power supply from the remote controller; and a power supply deactivation control unit which
maintains the activating of the power supply to the image capturing apparatus if the determination unit determines that the image capturing apparatus is directly activated by the user operation of the power supply button of the image capturing apparatus even when the image capturing apparatus receives the indication to deactivate power supply from the remote controller, and deactivates the power supply to the image capturing apparatus in response to the indication to deactivate power supply from the remote controller if the determination unit determines that the image capturing apparatus is activated by the indication to activate power supply from the remote controller.

2. The apparatus according to claim 1, further comprising:
a power supply monitoring unit which monitors a power supply state of the remote controller; and
a unit which deactivates the image capturing apparatus based on a monitoring result obtained by the power supply monitoring unit.

3. The apparatus according to claim 1, wherein the power supply deactivation control unit maintains activating power supply to the image capturing apparatus, if the apparatus is capturing moving images, even when receiving the indication to deactivate power supply to the image capturing apparatus from the remote controller, and wherein the power supply deactivation control unit deactivates power supply to the image capturing apparatus in response to the completion of capturing moving images.

4. The apparatus according to claim 1, further comprising;
an elapsed time monitoring unit which monitors an elapsed time of remote control by the remote controller,
wherein when the power supply is activated by the remote power supply activation unit, the power supply deactivation control unit controls the apparatus to deactivate the image capturing apparatus if a time for which the remote controller is disabled from remote controlling the image capturing apparatus exceeds a predetermined time.

5. The apparatus according to claim 1, wherein when the image capturing apparatus and the remote controller are connected by a cable, both the image capturing apparatus and the remote controller are activated while being connected by the cable, and when the image capturing apparatus and the remote controller are separated later, the power supply deactivation control unit inhibits power supply deactivation for the image capturing apparatus even when the remote controller is deactivated.

6. The apparatus according to claim 5, further comprising a power supply activation unit which, when the image capturing apparatus and the remote controller are separated and one of the image capturing apparatus and the remote controller are activated, and then the image capturing apparatus and the remote controller are connected by the cable, activates the not activated one of the image capturing apparatus and the remote controller.

7. A power supply control method for an image capturing apparatus which includes an image sensing unit and can communicate with a remote controller, the method comprising:
a direct power supply activation step of activating the image capturing apparatus by activating power supply to the image capturing apparatus when a power supply button of the image capturing apparatus is operated by a user;
a remote power supply activation step of activating the image capturing apparatus in response to an indication to activate power supply from the remote controller by activating power supply to the image capturing apparatus;
a receiving step of receiving an indication to deactivate power supply from the remote controller;
a determination step of determining, when at the receiving step the indication to deactivate power supply is received from the remote controller, whether the image capturing apparatus is directly activated by the user operation of the power supply button of the image capturing apparatus or the image capturing apparatus is activated by the indication to activate power supply from the remote controller; and
a power supply deactivation control step of
maintaining the activating of the power supply to the image capturing apparatus if at the determination step it is determined that the image capturing apparatus is directly activated by the user operation of the power supply button of the image capturing apparatus even when the image capturing apparatus receives the indication to deactivate power supply from the remote controller, and
deactivating the power supply to the image capturing apparatus if at the determination step it is determined that the image capturing apparatus is activated by the indication to activate power supply from the remote controller, in response to the indication to deactivate power supply from the remote controller.

8. A non-transitory computer readable recording medium recording a computer program for making a computer execute a power supply control method for an image capturing apparatus which includes an image sensing unit and can communicate with a remote controller, the method comprising:
a direct power supply activation step of activating the image capturing apparatus by activating power supply to the image capturing apparatus when a power supply button of the image capturing apparatus is operated by a user;
a remote power supply activation step of activating the image capturing apparatus in response to an indication to activate power supply from the remote controller by activating power supply to the image capturing apparatus;
a receiving step of receiving an indication to deactivate power supply from the remote controller;
a determination step of determining, when at the receiving step the indication to deactivate power supply is received from the remote controller, whether the image capturing apparatus is directly activated by the user operation of the power supply button of the image capturing apparatus or the image capturing apparatus is activated by the indication to activate power supply from the remote controller; and
a power supply deactivation control step of
maintaining the activating of the power supply to the image capturing apparatus if at the determination step it is determined that the image capturing apparatus is directly activated by the user operation of the power supply button of the image capturing apparatus even when the image capturing apparatus receives the indication to deactivate power supply from the remote controller, and
deactivating the power supply to the image capturing apparatus if at the determination step it is determined that the image capturing apparatus is activated by the indication to activate power supply from the remote controller, in response to the indication to deactivate power supply from the remote controller.

* * * * *